United States Patent
Lutz et al.

[15] 3,678,289
[45] July 18, 1972

[54] MAGNETIC FIELD CONTROL CIRCUIT FOR CROSSED FIELD SWITCHING DEVICES

[72] Inventors: Michael A. Lutz; Gunter A. G. Hofmann, both of Los Angeles, Calif.

[73] Assignee: Hughes Aircraft Company, Culver City, Calif.

[22] Filed: Aug. 18, 1971

[21] Appl. No.: 172,719

[52] U.S. Cl. .............................. 307/149, 307/117, 313/161, 317/11 C
[51] Int. Cl. ............................................. H01h 35/00
[58] Field of Search ............... 313/161, 153, 160, 157, 224, 313/231, 311; 317/11 R, 11 C; 307/149, 112, 116, 117; 315/115, 108, 111

[56] References Cited

UNITED STATES PATENTS

| 3,638,061 | 1/1972 | Lutz et al. | 313/161 |
| 3,558,960 | 1/1971 | Hofmann et al. | 313/161 |

Primary Examiner—Herman J. Hohauser
Attorney—W. H. MacAllister, Jr. et al.

[57] ABSTRACT

A conducting crossed-field switching device in a high voltage circuit can be offswitched by temporarily reducing the magnetic field to non-conductive conditions. While high voltage rises across the offswitching crossed-field device, the magnetic field strength-reducing pulse dissipates, but the conditions in the interelectrode space remain non-conductive.

9 Claims, 4 Drawing Figures

MAGNETIC FIELD CONTROL CIRCUIT FOR CROSSED FIELD SWITCHING DEVICES

BACKGROUND

This invention is directed to a particular manner of off-switching a crossed-field switching device by magnetic pulse flux reduction.

The use of crossed-field devices for switching is now known. The original Penning device of U.S. Pat. No. 2,182,736 was hardly more than a laboratory curiosity. Later development of the crossed-field device established its capability for off-switching of high voltage DC circuits. Kenneth T. Lian U.S. Pat. No. 3,534,226, and Gunter A. G. Hofmann and Ronald C. Knechtli U.S. Pat. No. 3,558,960, as well as Gunter A. G. Hofmann U.S. Pat. No. 3,604,977, granted Sept. 14, 1971, discuss in further detail the development of the crossed-field device as a means for offswitching high voltage, high current DC circuits.

Wasa U.S. Pat. No. 3,405,300 also discloses a crossed-field type of device for switching. The crossed-field device of Wasa employs magnetic field control and applies two fields. One is fixed and of insufficient flux to cause conduction, while the other field is provided by a magnetic field coil which is additive to the basic static flux to provide a total flux which is above the critical value to cause conduction. Offswitching of such a system is not discussed.

SUMMARY

In order to aid in the understanding of this invention, it can be stated in essentially summary form that it is directed to a magnetic field control circuit for crossed-field switching devices. Magnetic means, either permanent or electromagnetic, provides a field in the interelectrode space which is above the critical value for conduction. Second magnetic field means comprises a magnetic field pulse device which provides a bucking magnetic pulse of sufficient magnitude for a sufficient time to reduce the net magnetic field below the critical value to provide conditions in the interelectrode space by which the device becomes nonconductive and, while the voltage rises across the switching device, the pulsed magnetic flux is permitted to decay so that, when the voltage held off by the offswitching device is at line voltage, the net magnetic flux is solely due to the first magnetic flux means and the conditions remain nonconductive in the interelectrode space.

Accordingly, it is an object of this invention to provide a magnetic field pulse means for crossed-field switching devices. It is another object to provide a magnetic field control means which comprises a first magnetic field source which provides a magnetic field in the interelectrode space above the critical value at conduction conditions and less than the critical value at voltage holdoff conditions. It is a further object to provide a magnetic field control means whereby the main magnetic field produced by the first magnetic field source is nullified by a pulsed magnetic flux to below the critical value for a sufficient length of time to permit buildup of voltage across the crossed-field switching device. It is a further object to provide a control circuit for magnetic field pulse means whereby the total magnetic field is reduced below the critical value so that the conditions in the interelectrode space, including both the electric field and the magnetic field, are such that the device is in the nonconducting condition, even as the magnetic pulse is dissipated and the voltage across the device builds up.

Other objects and advantages of this invention will become apparent from the study of the following portion of the specification, the claims, and the attached drawings.

DESCRIPTION

Figure 1:
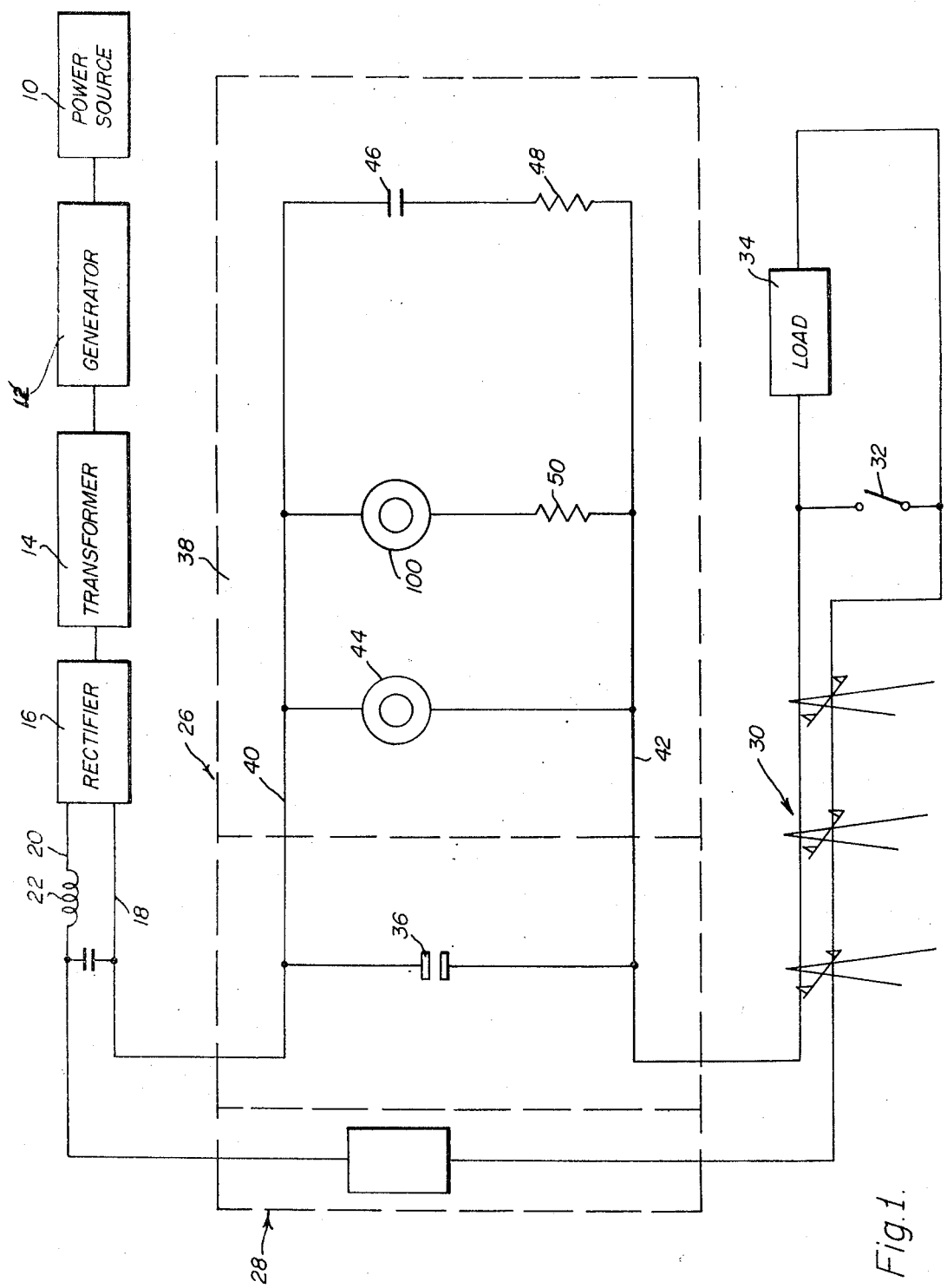
FIG. 1 is a schematic drawing of a circuit in which the crossed-field switching device of this invention can be employed for the offswitching thereof.

Referring to FIG. 1, the DC power which is to be switched by the circuit breaker employing the crossed-field switch device offswitching method and apparatus of this invention is conventionally derived at a power source 10 which delivers power to an AC generator 12. Generator 12 delivers its output to transformer 14 by which the voltage is raised to suitable transmission line voltage. From the transformer, the power is rectified by rectifier 16. Rectifier 16 has positive and negative output lines 18 and 20 respectively. Inductance 22, connected in one of the lines and capacitance 24, connected between the lines, served as conventional DC filtering and smoothing equipment. They are preferably connected at the output of the rectifier, as shown. In certain circumstances, the reactance of the transmission system may be sufficient to provide adequate smoothing for economic power transmission.

Circuit breaker 26 is serially connected in line 18 between the rectifier 16 and transmission system 30, while an identical circuit breaker 28 is connected in line 20 therebetween.

In high voltage DC systems, it is customary to have a line potential such that one line is above ground potential, while the other is below. This equalizes the amount of transmission line insulation between the two lines and ground. Either one of the lines, through the transmission system or at the load, may fault to each other, as by exemplary fault switch 32, or can fault to ground. Thus, independent line protection is necessary. Each of the circuit breakers 26 and 28 has conventional fault detection equipment associated therewith, as well as conventional programming circuitry to operate the circuit breaker through its breaking cycle. Thus, conventional fault detection and circuit breaker operating equipment is included.

Load 34 is connected at the output of transmission line 30. Switch 32 schematically represents a potential electrical fault across the lines on the load side of the circuit breakers. The fault can occur anywhere therealong, or between a line and ground.

Circuit breaker 26 comprises the line switch 36 and impedance-increasing means 38. The impedance-increasing means 38 is connected between breaker buses 40 and 42. Before the impedance is increased, it is necessary that this current be transferred from the line switch 36, in accordance with the concept discussed above. This current transfer is aided by crossed-field switch device 44, which is directly connected between buses 40 and 42. Thus, during the time of opening of line switch 36 add the current transfer, crossed-field switch device 44 is in conductive condition so that, when the voltage across the buses 40 and 42 rises to a sufficient potential to permit glow discharge conduction of the crossed-field switch device 44, it begins conducting and the potential between buses 40 and 42 is clamped at the voltage drop of device 44. In devices of the type under consideration, the voltage drop at high current is about 1 kilovolt. This fairly low potential permits the current to be fully transferred from the line switch 36 so that the line switch can fully open, deionize, and be in condition to hold off the surge potential. After line switch 36 has reached this condition, crossed-field switch device 44 can be turned off. Thereupon, with crossed-field switching device 100 in the conductive condition, the turning off of the crossed-field switching device 44 causes the ignition of crossed-field switch 100 so that current flows therethrough and through resistor 50. This increases the impedance of the circuit. Additional series-connected crossed-field switching devices and resistances can be connected in parallel thereto between buses 40 and 42, if more steps of impedance increasing is desired. Offswitching of switch device 100 permits the final surge to be absorbed in capacitor 46 and resistor 48. It is the off switching of the crossed-field switching devices 44 and 100 and similar devices to which this invention is directed. The impedance-increasing circuit and the circuit breakers just described are illustrative of situations in which a crossed-field switch device must be offswitched while carrying load. Other similar circumstances for offswitching of crossed-field switch devices are also within the scope of the present offswitching method and apparatus. Since the teaching of this invention is directed to the offswitching of a crossed-field switching device having current flowing therethrough, other impedance-increasing circuits containing crossed-field switching devices which must be offswitched under those circumstances are equally pertinent. Thus, the impedance-increasing means of K. T. Lian and W. F. Long patent application Ser. No. 45,147, filed June 10, 1970, entitled "Consecutive Crowbar Circuit Breaker" and M. A. Lutz patent application Ser. No. 45,460, filed June 11, 1970 for "Series Sequential Circuit Breaker" are pertinent. Each of these disclosures is incorporated herein in its entirety by this reference so that the several species of impedance-increasing circuits described therein are within the scope of this application. These circuits are also useful with the switch and method of this invention.

Figure 2:
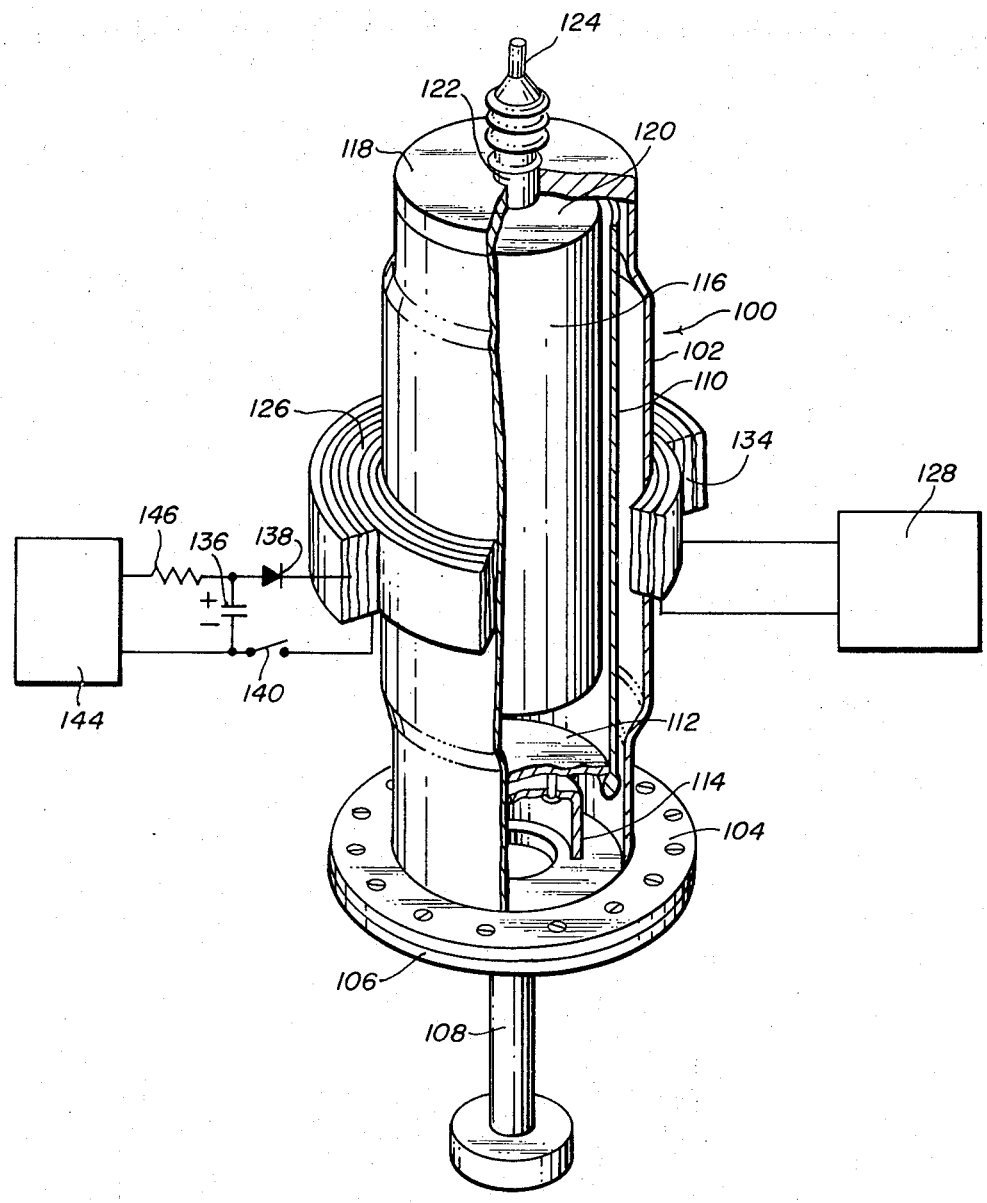
FIG. 2 is a perspective view, with parts broken away, of a crossed-field switching device having the magnetic field control means of this invention.

To further illustrate the apparatus of this invention, FIG. 2 shows a crossed-field device 100 identical to device 44 equipped for offswitching, in accordance with the method and apparatus of this invention.

Referring to FIG. 2, the crossed-field switch device 100 comprises housing 102 which is carried upon bottom flange 104. Bottom flange 104 is, in turn, mounted upon base flange 106 and they are secured together to provide a tight seal. Base flange 106 stands upon foot 108 for supporting the switch device structure. Furthermore, foot 108 can act as a vacuum connection for drawing a suitable vacuum on the interior of housing 102 and then letting into the housing the desired gas (e.g., helium or hydrogen, including its isotope deuterium) at the required pressure. Housing 102, together with bottom flange 104, serves as a suitable vacuum tight envelope.

Cathode 110 is in the form of cylindrical tube. It is spaced inwardly from housing 102. Cathode 110 has a lower cap 112 by which it is supported from base flange 106 by means of standoff 114. Lower cap 112 does not need to effect closure, but simply provides mechanical support for the cathode and reduces plasma end losses. By this construction, the entire cathode can be withdrawn through the large opening in bottom flange 104 when the flanges are separated for inspection and service of the cathode and inspection and service of the interior of housing 102. Cathode 110 is metallic and can be made of stainless steel. The cathode is connected to the foot 108, such as by a metallic strip. Thus, foot 108 provides one of the electrical connections to the switching device 100. Cathode 110 may have an axial slot to prevent the circumferential circulation of current during switching transients, when the axial magnetic field changes with time.

Anode 116 is of cylindrical tubular construction and is positioned concentrically with cathode 110 to provide a radial interelectrode space therebetween having the dimension $d$. The radial space $d$ is substantially equal at all facing positions of the anode and cathode. Housing 102 has a top cap 118 upon which anode 116 is positioned. The anode is maintained in position by employing anode cap 120 which is secured to the cylindrical anode 116 and, in turn, carries mounting stud 122. Mounting stud 122 provides both mechanical support by being secured to housing cap 118 and provides electrical continuity through the cap by electrical connector 124. Preferably, anode cap 120 is spaced below top cap 118 and connector 124 passes through insulative mounting stud 122 so that connector 124 and the entire anode are electrically separated from the housing. Alternatively, top cap 118 can be of insulative material.

Anode 116 may be perforated so that the interior space thereof serves as a gas volume to supply gas to the interelectrode space. Furthermore, gas supply means can be provided interiorly of the anode to supply gas as it is consumed by a glow discharge in the interelectrode space. Both these concepts are taught in Hofmann and Knechtli U.S. Pat. No 3,558,960. The maintenance of interelectrode space gas pressure is discussed in more detail in that patent.

Magnet 126 is positioned on the exterior of housing 102 in such a manner as to provide magnetic lines of force in the interelectrode space which are substantially parallel to the axis of the electrodes of switching device 100 over at least part of the electrode length. Magnet 126 is illustrated as being an electromagnet and such is preferred, so that the magnetic field can readily be switched on and off. The power supply 128 to magnet 126 is a fixed power supply which supplies the fixed field illustrated by line 130 of the graph of FIG. 4. The field strength is such as to provide an interelectrode field strength such that, considering the interelectrode spacing, the gas pressure and the electric field in the form of interelectrode voltage, the device 100 is in the conducting condition, when the electric field corresponds to the normal voltage drop during conduction. This is the point 132 in FIG. 3. This magnetic field strength is between 50 and 150 gauss; 70 gauss was found to be a preferred value for the dimensions given below, used in experiments to date, considering the turnoff effects, as well as the magnet power consumption.

Figure 3:
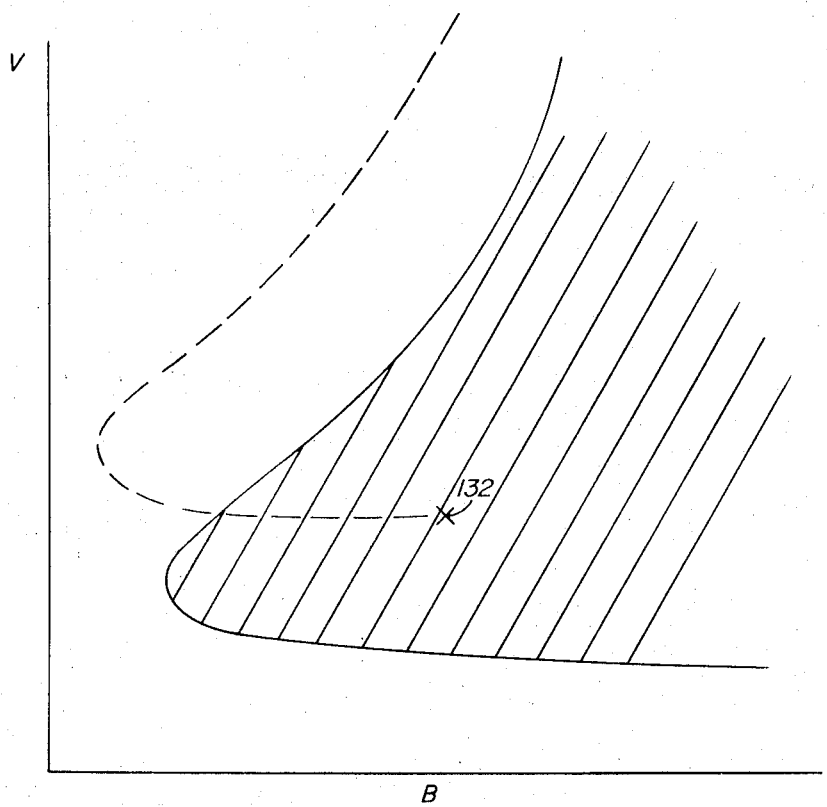
FIG. 3 is a graph of voltage versus magnetic flux in the interelectrode space which results in conductive conditions and shows the net magnetic field during offswitching.
Figure 4:
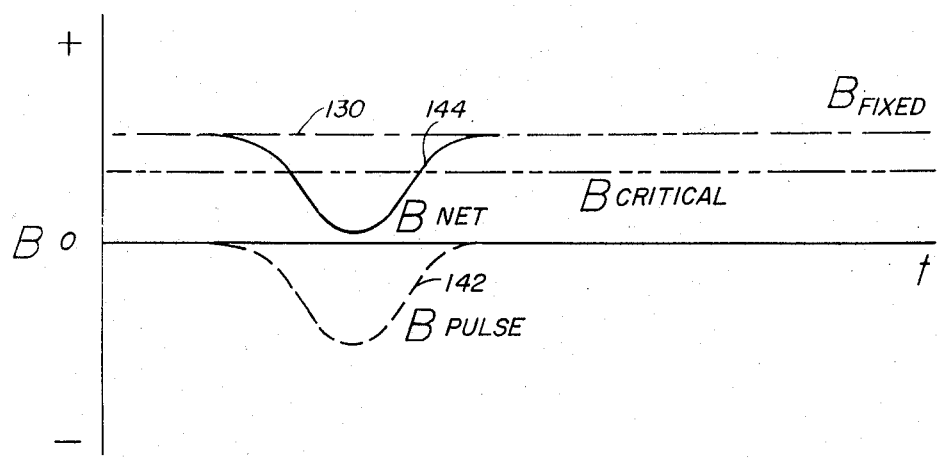
FIG. 4 is a graph showing the magnetic field versus time for each of the two separate magnetic field sources and the net field.

FIG. 3 illustrates the conductive region of a crossed-field device of the nature discussed within the hatched area, in terms of the interelectrode voltage and the interelectrode flux magnetic field. The voltage and magnetic field levels place the point 132 within the toe of the conductive region, as illustrated. Under these conditions, once a flow discharge is established and current is flowing, the voltage drop of the device 100 maintains the voltage at the point indicated for continued conduction.

In addition to the magnet 126, electromagnet 134 is positioned to impress a field upon the interelectrode space, when it is energized. Capacitor 136 is serially-connected through diode 138 (which can also be parallel to the electromagnet 134), the electromagnet coil 134, and switch 140. When the capacitor 136 is charged and switch 140 is closed, discharge of capacitor 136 through diode 138 and electromagnet coil 134 causes a magnetic field pulse which bucks the magnetic field caused by the main field source 126. This bucking magnetic pulse is indicated at 142 in FIG. 4. This produces a net field 144, shown in full lines in FIG. 4, which temporally changes from the value of the fixed pulse to a reduced value for a period of time, and then returns to the value of the fixed flux after capacitor 136 is dissipated. Diode 138 is to prevent current reversal. Capacitor charger 144 charges capacitor 136 through resistor 146, after switch 140 is reopened, in preparation for the next pulse.

The value of pulse 142 is illustrated as being sufficient to drive the net field nearly to zero. However, the bucking pulse can be larger to bring the net flux to zero, or even below zero. The result of this pulse is illustrated in FIG. 3, wherein the interelectrode conditions follow the dotted line leftward from point 132. The reduction in field does not affect conductivity until the edge of the conductive region, typically 50 gauss, is reached. Thus, the dotted line is horizontal to the transition to nonconductivity. Conductivity is caused in these devices by cascading ionization, and the reduction in the magnetic field increases the mean electron path length to change from a statistical condition of continuing cascading ionization to a condition of inadequate collisions to maintain continued ionization for conduction. Thus, when the magnetic field reaches its transition point, ionization decreases and the voltage rises. The rate of voltage rise is limited by the circuit capacitance, such as the capacitors 24 and 46. Thus, the pulse 142 must be of sufficient time duration to maintain the combined conditions of flux versus voltage outside of the conductive region as the voltage rises. An exemplary curve is shown in dotted lines.

In a particular example of this physical configuration of the switching device of FIG. 2, the interelectrode radial distance is about 15 millimeters, with an anode diameter of 90 millimeters and axial length of 300 millimeters. Normal gas pressure in the interelectrode space is about 0.04 millimeter of mercury. Hydrogen is one possible gas. With such dimensions, the switching device is capable of offswitching DC loads of 1,000 amperes and holdoff 25 kilovolts with recovery time in the order of about 25 microseconds.

A typical magnetic field strength for conduction is 100 gauss. However, once the device becomes nonconductive and the voltage across its terminals rises to a sufficiently high value that the 100 gauss field cannot sustain a discharge (typically 10 kv), the 100 gauss field can be reapplied without danger of restrike. If, upon offswitching, the rate of voltage rise is about 1 kv per microsecond and, if 100 gauss is not sufficient to produce conduction, when the voltage is above 10 kv, the field only needs to be held below the critical value for about 10 microseconds. This means a simple capacitor discharge through the bucking coil lasting about 10 microseconds is sufficient to drive the tube into nonconduction. With coil 134 inductance of 250 microsecond henry and requiring the half period of the bucking current to be 20 microseconds, a capacitor 136 of about one-sixth microfarad is satisfactory.

Previous devices attempted to reduce the field to below the critical value required for conduction and hold it there until offswitching was completed. A typical critical value of magnetic field is 50 gauss.

This invention having been described in its preferred embodiment, it is clear that it is susceptible to numerous modifications and embodiment within the ability of those skilled in the art.

What is claimed is:

1. A crossed-field switching device for offswitching direct current flowing therethrough, said crossed-field switching device comprising:

concentric anode and cathode electrodes having an annular space therebetween, the radial dimension of the space being substantially uniform and defining the direction of the electric field;

magnetic field means for applying a substantially axial magnetic field to the interelectrode space and a gas within the interelectrode space such that, upon the application of potential, cascading ionization occurs to cause electric conduction between said electrodes in the glow discharge mode, the improvement comprising:

an electromagnetic coil positioned exteriorly of said interelectrode space and electric pulse means connected to said electromagnetic coil for electrically pulsing said electromagnetic coil to cause a magnetic pulse in said interelectrode space of sufficient magnitude and in such a direction as to reduce the net magnetic field within the interelectrode space below the critical value where interelectrode electric conduction can continue for a sufficient length so that conduction ceases and electric current conduction is stopped and, thereupon, the magnetic pulse is completed so that the net magnetic field substantially equals the field of said magnetic field means.

2. The apparatus of claim 1 wherein said electric pulse means includes a capacitor which is connected to be discharged through said electromagnetic coil to cause said electromagnetic pulse.

3. The apparatus of claim 1 wherein said electric pulse means comprises a capacitor and a switch serially connected to said electromagnetic coil, and a diode connected to said capacitor to prevent return current flow.

4. The apparatus of claim 3 wherein said diode is serially connected to said capacitor.

5. The apparatus of claim 4 wherein capacitor charging means is connected to said capacitor.

6. The apparatus of claim 1 wherein said switching device is part of a circuit breaker which is connected between an electric current generator and a load.

7. The apparatus of claim 5 wherein said switching device is part of a circuit breaker which is connected between an electric current generator and a load.

8. The method of offswitching a crossed field switching device having concentric anode and cathode electrodes with an annular interelectrode space therebetween, a gas within the interelectrode space, a first magnetic field means for providing a substantially uniform axial magnetic field in the interelectrode space above the critical value for glow discharge conduction, and a pulse magnetic field means capable of applying a magnetic field pulse in the interelectrode space comprising the steps of:

conducting electric current through said switching device by glow discharge due to cascading ionization in the interelectrode space between said electrodes;

pulsing the magnetic field pulse means to reduce the net magnetic field in the interelectrode space below the critical electromagnetic field strength to cause cessation of cascading ionization of the gas in the interelectrode space to raise the electrical potential between the electrodes; and permitting the pulsed magnetic field to dissipate until the net magnetic field reaches the value of the fixed magnetic field as the interelectrode electrical potential rises while maintaining the interelectrode conditions such as to inhibit cascading ionization in the interelectrode space.

9. The method of claim 6 wherein the pulsing of the magnetic field is caused by electrically connecting a charged condenser to the electromagnetic field coil which produces the magnetic field pulse.

* * * * *